UNITED STATES PATENT OFFICE.

OTTO WOLFES, OF DARMSTADT, GERMANY.

N-HALOGENALKYL-C. C-DIALKYLBARBITURIC ACIDS AND PREPARATION OF THE SAME.

1,073,380. Specification of Letters Patent. Patented Sept. 16, 1913.

No Drawing. Application filed December 13, 1912. Serial No. 736,628.

*To all whom it may concern:*

Be it known that I, OTTO WOLFES, a subject of the Emperor of Germany, and a resident of Darmstadt, in the Grand Duchy of Hesse-Darmstadt, German Empire, have invented certain new and useful Improvements in N-Halogenalkyl-C. C-Dialkylbarbituric Acids and Preparation of the Same, of which the following is a specification.
My invention relates broadly to a method for the preparation of N-halogenalkyl-C. C-dialkylbarbituric acids of the general type:

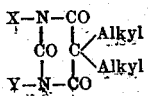

(X=halogenalkyl, Y=hydrogen or halogenalkyl) and consists either in treating N-alkylene-C. C-dialkylbarbituric acids with halogen, or with halogen-hydrids.

The N-halogenalkyl-C. C-dialkylbarbituric acids obtained by the method decribed below differ in a characteristic manner from the already known N-alkyl-C. C-dialkylbarbituric acids (*Annalen*, 335, 1904, page 349). The new compounds not only contain the residue of the dialkylbarbituric acids, which has become very valuable in modern medicine owing to its narcotic action, but also a halogen in the side chain which particularly in the case of the bromin derivatives exhibits an important sedative action, which is characteristic of the organic bromin compounds. In this manner the new compounds incorporate the therapeutically highly valuable combination of two effects and thus represent an important addition to materia medica.
My invention is shown by the following examples:

1. The condensation of monoallyl urea with diethylmalonic ester is effected as indicated in German Patent No. 146,496 for other derivatives of urea. N-monoallyl-C. C-diethylbarbituric acid crystallizes from dilute alcohol in colorless needles melting at about 77° C. The crystals are readily soluble in alcohol, ether, benzol, and dilute caustic alkalis.

For the preparation of the bromin derivative 33 parts of N-monoallyl-C. C-diethylbarbituric acid are dissolved in 40 parts of glacial acetic acid with the aid of heat. The solution is then rapidly cooled, and a solution of 26 parts of bromin in 20 parts of glacial acetic acid is added, with stirring, care being taken to keep the mixture cool. At first the halogen is quickly taken up, then more slowly. After the mixture has been allowed to stand at a temperature of 2° to 3° C. for about one hour, crystallization is brought about by stirring. After standing for another hour the crystals are separated by the aid of a centrifuge and covered with 50% alcohol. By recrystallization from hot alcohol, or by solution in hot toluol and precipitation by petroleum ether, N-dibromopropyl-C. C-diethylbarbituric acid

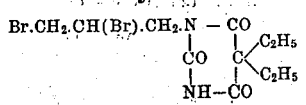 is obtained in colorless, small needles, melting at 124° C. (corr. 126°).

2. A solution of 85 parts of bromin in 100 parts of glacial acetic acid is slowly added, with stirring, to a suspension of 174 parts of C. C-dibenzyl-N-monoallylbarbituric acid (prepared from dibenzyl malonic ester and monoallyl urea; melting point 130° C.) in 500 parts of glacial acetic acid, care being taken to keep the mixture cool. The solution is allowed to stand at a low temperature for an hour, protected from light, and is then poured into ice-water. The tough precipitate is well treated with water several times, whereupon it is recrystallized from 90% alcohol with the addition of animal charcoal. The new product—C. C-dibenzyl-mono-N-dibromo-propylbarbituric acid— crystallizes slowly in hard, small prisms, melting at 111° C. The compound is readily soluble in hot alcohol, ether and benzol. It is insoluble in water.

3. 224 parts of C. C-diethyl-N-monoallylbarbituric acid are dissolved in 500 parts of glacial acetic acid. Chlorin gas is passed into the mixture until the increase in weight amounts to 72 parts, the operation being conducted in subdued light, keeping the mixture cool. After standing for one hour the product of the reaction is precipitated by ice-water, carefully washed, and recrystallized from 90% alcohol, with the addition of animal charcoal. The compound—C. C-diethyl-N-dichloropropylbarbituric acid—corresponds to the following formula:

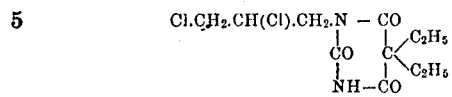

Melting point 127° C. It is very readily soluble in chloroform, ether and alcohol. It also dissolves in dilute cold caustic soda solution without separation of halogen, and can be again precipitated by the addition of an acid.

4. 5 parts of C. C-diethyl-N-monoallylbarbituric acid are heated for one hour to 100° C. with 20 parts of glacial acetic acid, which have been previously saturated with hydrogen bromid. Crystallization sets in already on cooling. To completely separate the reaction product the solution is mixed with water. The precipitate is recrystallized from benzin or dilute alcohol. The product then melts at 100° C. The compound is sparingly soluble in water, readily soluble in alcohol, ether and benzol. C. C-diethyl-N-monobromopropylbarbituric acid has probably the following composition:

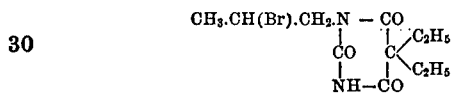

5. 13.6 parts of C - phenyl - C - ethyl - N-monoallylbarbituric acid (prepared from phenylethylmalonic ester and monoallyl urea, crystals melting at 68° to 69° C., readily soluble in alcohol, ether, ethyl acetate and benzol) are dissolved in 20 parts of glacial acetic acid and well cooled. A solution of 9 grams of bromin in 15 grams of glacial acetic acid is gradually added, with stirring; at the end of half an hour the solution is poured on to ice and the precipitate is carefully treated with ice-water. The product—C- phenyl- C- ethylmono- N -dibromo-propylbarbituric acid—is then purified by recrystallization from dilute alcohol or methyl alcohol. It is readily soluble in alcohol, ether and benzol, it contains 37% of bromin, and corresponds to the formula $C_{15}H_{16}O_3N_2Br_2$.

6. NN-diallyl-C. C-diethylbarbituric acid may also easily be brominated in the following manner: A solution of 160 parts of bromin in 200 parts of benzol is gradually added, with stirring, to 130 parts of the oil diluted with 200 parts of benzol, care being taken to keep the mixture cool. The benzol is carefully removed by distillation, preferably under diminished pressure, the residue dissolved with the aid of heat in 500 parts of absolute alcohol and the solution cleared with animal charcoal. On cooling, an oil first separates which slowly but completely assumes crystalline form. The NN-tetra-bromodipropyl-C. C-diethylbarbituric acid thus obtained is carefully dried. It forms small, colorless prisms, melting at 64° C. On analysis it was found to contain 54.7% of bromin, whereas for $C_{14}H_{20}O_3N_2Br_4$ a content of 54.8% of bromin was calculated.

What I claim and desire to secure by Letters Patent is:

1. As a new product of manufacture N-halogenalkyl-C. C - dialkyl - barbituric acid containing the atom group

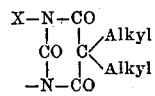

(X=halogenalkyl).

2. As a new product of manufacture mono-N-halogenalkyl-C. C-dialkyl-barbituric acid of the general formula:

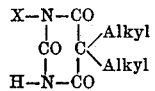

(X=halogenalkyl).

3. As a new product of manufacture mono-N - dihalogenalkyl - C. C - dialkylbarbituric acid of the general formula:

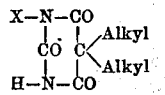

(X=dihalogenalkyl).

4. As a new product of manufacture mono-N-dibromoalkyl-C. C-dialkylbarbituric acid of the general formula:

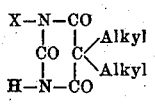

(X=dibromoalkyl).

5. As a new product of manufacture mono-N - dibromopropyl - C. C - diethylbarbituric acid of the formula:

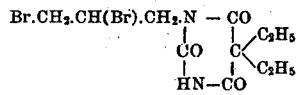

appearing in needles of the melting point of 124° C. (corr. 126° C.).

6. The method of producing N-halogenalkyl-C. C-dialkylbarbituric acids and which consists in treating N-alkylene-C. C-dialkylbarbituric acids with substances adding halogen.

7. The method of producing N-halogenalkyl-C. C-dialkylbarbituric acids and which consists in treating mono-N-alkylene-C. C-dialkylbarbituric acids with substances adding halogen.

8. The method of producing mono-N-bromoalkyl-C. C-dialkylbarbituric acids and which consists in treating mono-N-alkylene-C. C-dialkylbarbituric acids with substances adding bromin.

9. The method of producing mono-N- dibromopropyl-C. C-dialkylbarbituric acids and which consists in treating mono-N-allyl-C. C-dialkylbarbituric acid with bromin.

10. The method of producing mono-N-dibromopropyl-C. C-diethylbarbituric acid and which consists in treating mono-N-allyl-C. C-diethylbarbituric acid with 2 atoms of bromin.

In testimony whereof I have hereunto signed my name in the presence of the two subscribing witnesses.

OTTO WOLFES.

Witnesses:
   JEAN GRUND,
   CARL GRUND.